(12) United States Patent
Liao

(10) Patent No.: US 11,120,245 B2
(45) Date of Patent: Sep. 14, 2021

(54) ELECTRONIC DEVICE AND METHOD FOR OBTAINING FEATURES OF BIOMETRICS

(71) Applicant: Wistron Corporation, New Taipei (TW)

(72) Inventor: Chien-Fu Liao, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 16/747,476

(22) Filed: Jan. 20, 2020

(65) Prior Publication Data
US 2021/0142034 A1    May 13, 2021

(30) Foreign Application Priority Data
Nov. 8, 2019    (TW) ................. 108140599

(51) Int. Cl.
*G06K 9/00* (2006.01)
*G06F 21/32* (2013.01)
*H04L 9/32* (2006.01)

(52) U.S. Cl.
CPC ......... *G06K 9/00067* (2013.01); *G06F 21/32* (2013.01); *G06K 9/00087* (2013.01); *H04L 9/3231* (2013.01)

(58) Field of Classification Search
None
See application file for complete search history.

(56) References Cited

U.S. PATENT DOCUMENTS

| 10,848,321 | B2 | 11/2020 | Piel |
| 2001/0044900 | A1 | 11/2001 | Uchida |
| 2007/0036400 | A1 | 2/2007 | Watanabe et al. |
| 2017/0091526 | A1* | 3/2017 | John Archibald . G06K 9/00093 |
| 2018/0341824 | A1* | 11/2018 | Huang ................ G06F 21/32 |
| 2019/0332755 | A1 | 10/2019 | Li et al. |
| 2020/0233943 | A1 | 7/2020 | Adjaz et al. |

FOREIGN PATENT DOCUMENTS

| CN | 101901336 | 12/2010 |
| CN | 106023205 | 10/2016 |
| CN | 106936775 | 7/2017 |
| CN | 109829493 | 5/2019 |
| EP | 2833294 | 2/2015 |
| EP | 3686788 | 7/2020 |

OTHER PUBLICATIONS

"Search Report of Europe Counterpart Application", dated Oct. 9, 2020, p. 1-p. 14.
"Office Action of Taiwan Counterpart Application", dated Jun. 18, 2020, p. 1-p. 24.
"Office Action of India Counterpart Application", dated Jul. 17, 2021, p. 1-p. 8.

* cited by examiner

*Primary Examiner* — Joseph R Haley
(74) *Attorney, Agent, or Firm* — JCIPRNET

(57) ABSTRACT

An electronic device and a method for obtaining features of biometrics are provided. The method includes: obtaining an image including a plurality of biological features; obtaining a plurality of feature points of the biological features in the image; dividing the image into a plurality of sub-images, and obtaining a region in each of the sub-images; and identifying from among a plurality of second feature points in the region in each of the sub-images a plurality of third feature points for performing a biometric operation.

25 Claims, 10 Drawing Sheets

ELECTRONIC DEVICE AND METHOD FOR OBTAINING FEATURES OF BIOMETRICS

CROSS-REFERENCE TO RELATED APPLICATION

This application claims the priority benefit of Taiwan application Ser. No. 108140599, filed on Nov. 8, 2019. The entirety of the above-mentioned patent application is hereby incorporated by reference herein and made a part of this specification.

BACKGROUND

Technical Field

The invention relates to an electronic device and a feature obtaining method, and particularly relates to an electronic device and a method for obtaining features of biometrics.

Description of Related Art

Biometrics is a secure, reliable and accurate identity verification means using biological features that are usually unique, measurable, hereditary, or life-long, etc., with assistance of advanced computer technology nowadays, and can further realize applications such as automation, intelligent management, etc. At present, the most commonly used biometric techniques include fingerprint identification, human face identification, palmprint identification, voice (or voiceprint) identification, vein identification, etc. The current fingerprint identification technique and finger vein identification technique are described below.

[Fingerprint Identification]

Generally, a principle of fingerprint identification is to first perform a classification using an overall feature (for example, pattern, delta, etc.) of a fingerprint and then perform an identity recognition using a local feature (for example, position, direction, etc.). The fingerprint identification mainly includes four steps: fingerprint image reading, feature extraction, data saving and comparison.

Fingerprint acquisition methods may include four types: optical, capacitive, biological radio frequency (RF), and ultrasonic. The optical type has the longest history and is most widely used, which is usually performed by putting a finger on an optical lens, and projecting the finger onto a complementary metal oxide semiconductor (CMOS) or a charge coupled device (CCD) by built-in near infrared ray (NIR) irradiation to form an image through absorption, and finally digitizing the image for processing by different fingerprint algorithms.

In addition, fingerprint identification is sensitive to the state of a person being verified or the environment where the person being verified is located. For example, some people have few fingerprint features, some people's fingerprints have worn down through long use and cannot be scanned into images, some people have skin peeling on their fingers, some people's fingers are dirty, the temperature of the environment is too low, etc., and the biggest risk is that it is easy to leave traces such that people with bad intentions may be able to copy a fingerprint onto a film and use it to fool an identification device.

[Finger Vein Identification]

A principle of finger vein identification is to irradiate a finger with NIR light, so that hemoglobin flowing in veins may absorb the NIR light, and the unabsorbed NIR light may enter a sensor to obtain a clear vein image. After this image is processed by algorithms, a specific vein template is formed. It has been medically proved that everybody has a different vein image. Therefore vein template can be regarded as a unique biological feature.

Finger vein identification includes four main phases: image acquisition, pre-processing, feature extraction, and feature matching. An acquisition device may be classified as a reflective type in which an NIR source and an image sensor are located on the same side, or a direct type in which an NIR source and an image sensor are respectively located on both sides. The pre-processing refers to removal of image noise. The feature extraction includes extraction of the features of lines, textures and minutiae points, and those acquired through learning. The feature matching is to compare the features with stored data.

However, a defect of finger vein identification is that a finger vein may change with age and physiology, and its permanence has not been confirmed. Moreover, the equipment for acquiring a finger vein is not easy to miniaturize, a design thereof is relatively complex, and the manufacturing cost is high.

Particularly, most of the related art uses a single biological feature (for example, using fingerprint only or finger vein only) for identification, and rarely mentions using multiple biological features (for example, using both fingerprint and finger vein) at the same time for identification.

SUMMARY

The invention is directed to an electronic device and a method for obtaining features of biometrics, which integrate and simultaneously use multiple biological features (for example, fingerprint and finger vein) for identification, thereby improving accuracy and convenience of biometrics.

The invention provides an electronic device including an input circuit and a processor coupled to the input circuit. The input circuit obtains an image including a plurality of biological features of a user. The processor obtains a plurality of feature points of the plurality of biological features in the image. The processor divides the image into a plurality of sub-images, and obtains a region in each of the plurality of sub-images, wherein each of the plurality of sub-images includes a plurality of first feature points among the plurality of feature points, and a plurality of second feature points among the plurality of first feature points have a higher distribution density in the region than in other regions in the sub-image where the region belongs to. The processor identifies from among the plurality of second feature points in the region in each of the plurality of sub-images a plurality of third feature points for performing a biometric operation.

The invention provides a method for obtaining features of biometrics, which is adapted to an electronic device, wherein the electronic device includes an input circuit and a processor, and the method includes the following. An image including a plurality of biological features of a user is obtained by the input circuit. A plurality of feature points of the plurality of biological features in the image are obtained by the processor. By the processor, the image is divided into a plurality of sub-images and a region in each of the plurality of sub-images is obtained, wherein each of the plurality of sub-images includes a plurality of first feature points among the plurality of feature points, and a plurality of second feature points among the plurality of first feature points have a higher distribution density in the region than in other regions in the sub-image where the region belongs to. A plurality of third feature points for performing a biometric operation are identified from among the plurality of second feature points in the region in each of the plurality of sub-images by the processor.

Based on the above description, the invention provides an electronic device and a method for obtaining features of biometrics, which integrate and simultaneously use multiple biological features (for example, fingerprint and finger vein) for identification, thereby improving accuracy and convenience of biometrics. Particularly, the invention uses an NIR optical principle to obtain a finger image and uses an algorithm to obtain the optimal biological features for identification to perform multi-modal identification, thereby improving preservation, remote backup and identification of biological features. In terms of applications, the invention may be used by companies and enterprises to strengthen access control and attendance management of employees. Or, an application programming interface (API) for development purposes may be provided and connected to other devices via a USB to form the Internet of things, which can be used to develop an application system in combination with biometrics, access management, information utilization, etc., thereby creating business opportunities in other fields such as finance industry and security industry and increasing profits.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
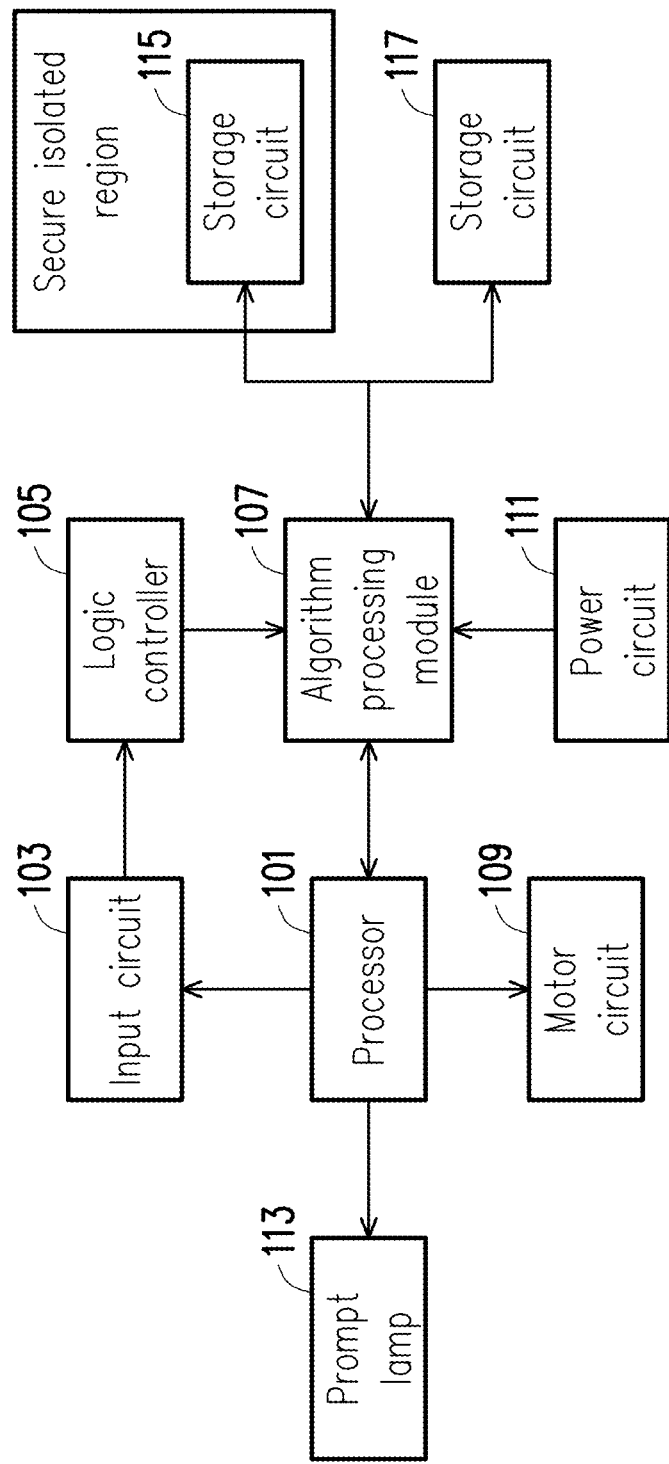
FIG. 1 is a schematic diagram of an electronic device according to an embodiment of the invention.

FIG. 1 is a schematic diagram of an electronic device according to an embodiment of the invention.

Referring to FIG. 1, an electronic device 100 includes a processor 101, an input circuit 103, a logic controller 105, an algorithm processing module 107, a motor circuit 109, a power circuit 111, a prompt lamp 113 and storage circuits 115 to 117.

The processor 101 may be a micro controller unit (MCU), or a processor integrating memory and computation functions of a central processing unit (CPU), a random-access memory (RAM), a read only memory (ROM) and an I/O device.

The input circuit 103 may include a finger sensor and an acquisition control circuit, and is configured to acquire a fingerprint image according to preset acquisition parameters, and transmit image data to the algorithm processing module 107.

The logic controller 105 may be a complex programmable logic device (CPLD), and is configured to access and pre-process the image acquired by the input circuit 103, and transmit a result to the algorithm processing module 107.

The algorithm processing module 107 may be a digital signal processor (DSP), and is configured to implement an algorithm described in the invention. Main functions of the algorithm processing module 107 include receiving the image transmitted by the logic controller 105, drawing a conclusion of image identification upon processing the image, and managing a communication between the storage circuits 115 to 117 and the processor 101.

The motor circuit 109 is configured to receive an indication signal from the processor 101 to determine whether to lock or unlock the electronic device 100.

The power circuit 111 is configured to supply power to the entire electronic device 100.

The prompt lamp 113 may be an LED indicator, etc.

The storage circuit 115 may be a flash memory external to the electronic device 100 and is configured to store a feature database and a startup program of the DSP which are usually stored in a secure isolated region and encrypted for protection. The storage circuit 115 does not directly store an image for biometric identification, but stores characters corresponding to the image, and the characters must be encrypted during storage and retrieval. The storage circuit 117 may be a synchronous dynamic random-access memory (SDRAM) external to the electronic device 100, and is configured to store images for temporary comparison and some variables.

Particularly, the electronic device 100 of the invention uses a near-infrared ray (NIR) optical principle to obtain an image including both a fingerprint and a finger vein for analysis.

Figure 2:
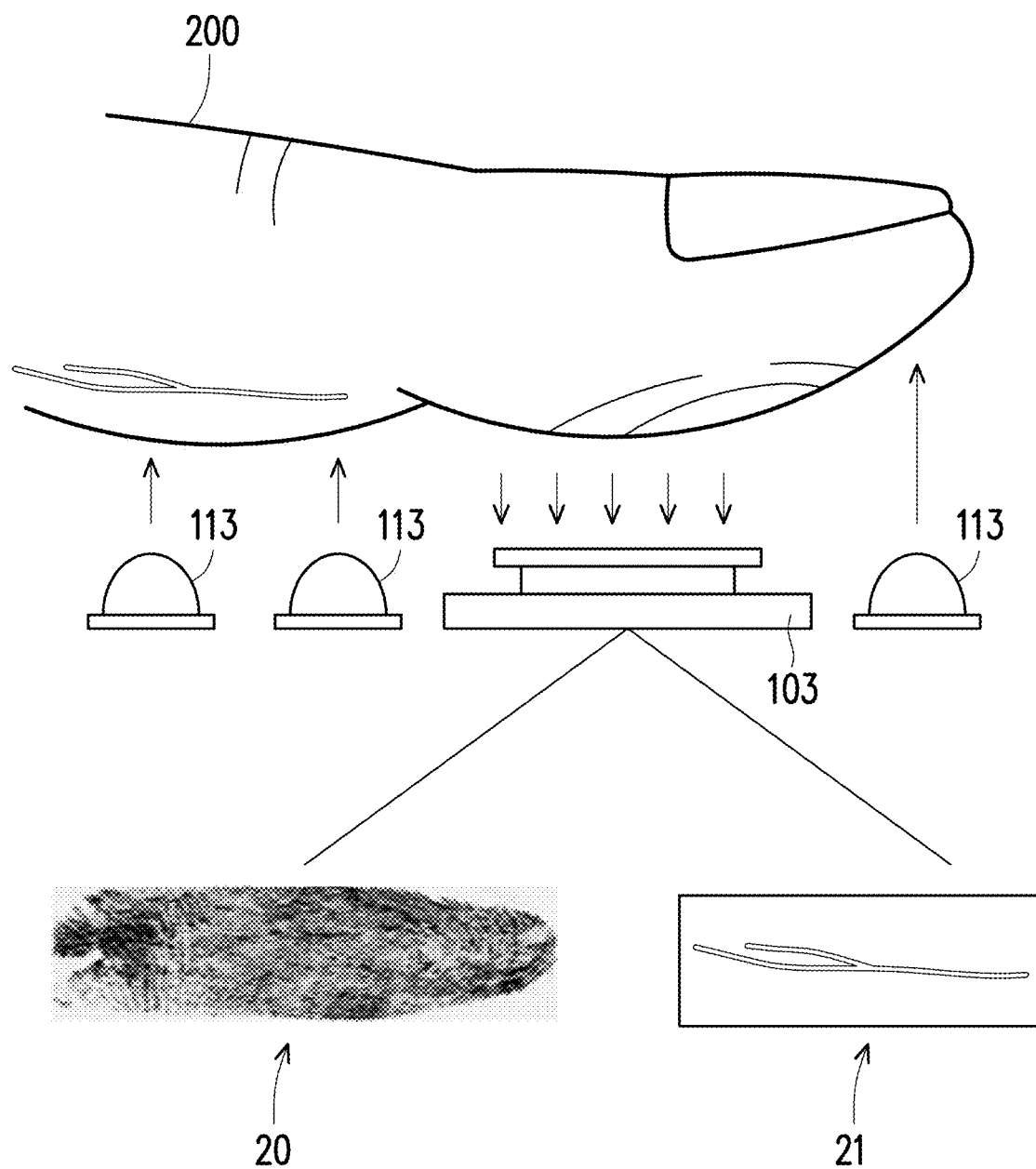
FIG. 2 is a schematic diagram of acquiring an image including both a fingerprint and a finger vein according to an embodiment of the invention.

For example, FIG. 2 is a schematic diagram of acquiring an image including both a fingerprint and a finger vein according to an embodiment of the invention.

Referring to FIG. 2, it is assumed that a user puts a finger 200 on a sensing area (not shown) of the electronic device 100, and after the finger 200 is irradiated by the prompt lamp 113, through absorption using the input circuit 103, images of a fingerprint 20 and a finger vein 21 of the finger 200 are obtained at the same time. Particularly, although not illustrated in FIG. 2, in the embodiment, the fingerprint 20 and the finger vein 21 are integrated into a single image. Thereafter, the obtained image may be converted into digital information and subjected to subsequent processing by algorithms.

It should be noted that for a fingerprint of a finger surface, 60 to 125 feature points are usually captured. If the feature points of the finger vein are considered at the same time, the "curse of dimensionality" is likely to occur. Therefore, the invention provides a method for obtaining features of biometrics, by which feature points for biometrics can be found among the feature points of fingerprint and finger vein in the same image. The number of these feature points is relatively small and will not reduce the accuracy of biometrics. Five main steps of the method for obtaining features of biometrics are described in detail below.

[Step One: Image Division]

In step one, the input circuit 103 obtains an image including a fingerprint and a finger vein of a user according to the method of FIG. 2. The processor 101 performs a pre-processing and a binarization processing on the image. Particularly, the invention does not limit the content of the pre-processing. Then, the processor 101 performs a mathematical morphology operation on the binarized image and obtains a plurality of feature points in the image. The mathematical morphology operation here is an image analysis method based on the mathematical set theory, and a principle thereof is to perform detection through translation within the entire original image area through a structure element that can change in size and shape according to requirements. Basic operations of the mathematical morphology operation include erosion, dilation, opening, and closing. Advanced operations include hit-or-miss transform for detecting a shape, contour extraction for finding a shape edge, extraction of connected component for extracting features and shapes of interest from an image, thinning for reducing a size of an input image without losing its original shape, and skeleton extraction for finding a center line of a shape and using a skeleton to represent the shape of an object, etc.

[Step Two: Feature Extraction]

After completing step one, the processor 101 classifies the different features of fingerprint and finger vein into types, and marks each of the feature points with its type in the binarized image. The features of fingerprint mainly include pattern, pattern area, core, delta and ridge count, node, end point and bifurcation, as well as isolated point, enclosure, short ridge, etc. The features of finger vein include texture structure, endpoint, intersection, etc., and the processor 101 marks these features respectively in the binarized image.

[Step Three: Feature Selection]

In step three, the processor 101 divides the image processed in step two into a plurality of sub-images, and obtains a specific region in each of the sub-images. Particularly, a plurality of feature points distributed in each of the sub-images may be referred to as "first feature points". The feature points (also referred as second feature points) distributed in the specific region have higher density in the specific region of each sub-image than in other regions in the sub-image. In the embodiment, the above method obtains the specific region of each of the sub-images through a particle swarm optimization (PSO) algorithm.

To be specific, the PSO algorithm has been developed based on a concept of "bird flock foraging", and has advantages such as easy implementation, high precision, fast convergence, etc. In each iterative operation, a particle adjusts its flight speed according to its own and other particles' flight experience, and flies toward a location of the most food (i.e. the most feature points) in the particle swarm. The operation is iterated until convergence, and finally an optimal solution (i.e. region with the most feature points) is obtained. In a PSO equation, each symbol is defined as follows:

i: represents particle (certain divided block).

t: represents number of times of iterating the operation.

w: represents weight value, needs to be set manually, and is generally set as: $0.8<w<1.2$, because such a value of w is more likely to achieve a balance between global search and local search.

c1: represents local solution related coefficient, needs to be set manually, is generally set at 2, but is not necessarily equal to 2. When this coefficient is set too large, the algorithm is likely to become a local search.

c2: represents global solution related coefficient, needs to be set manually, is generally set at 2, but is not necessarily equal to 2. When this coefficient is set too large, the algorithm is likely to become a global search.

$p_i$: $p_i = (p_{i1}, p_{i2}, \ldots, p_{id})$ is the optimal position in each dimension where a particle i passes through in a search space, i.e. a local solution of the particle i.

$p_g$: $p_g = (p_{g1}, p_{g2}, \ldots, p_{gd})$ is the optimal position in each dimension where the whole particle swarm passes through in the search space, i.e. a global solution of the whole particle swarm.

rand( ): is a random number between $[-1,1]$. Since $p_i$ and $p_g$ may both be positive values or negative values, the velocity at this moment may be oriented (i.e., only the negative values are getting bigger, or only the positive values are getting bigger), and the chance of changing the direction is not high, it is suggested that rand( ) be set as a floating-point random number between $[-1, 1]$.

Based on the above, velocity and position update equations formulae of the particle i in a $j^{th}$ dimensional space are as follows:

[Velocity]

$$v_{ij}(t+1) = w \cdot v_{ij}(t) + c1 \cdot \text{rand}( ) \cdot (p_{ij}(t) - x_{ij}(t)) + c2 \cdot \text{rand}( ) \cdot (p_{gj}(t) - x_{ij}(t))$$

[Position]

$$x_{ij}(t+1) = x_{ij}(t) + v_{ij}(t+1)$$

Solution space is first defined for all problems to be dealt with PSO. However, during a position update, a particle may be out of bounds. Therefore, the solution space of the particle must be adjusted, and then a random position $(x_{id}\_\text{min}, x_{id}\_\text{max})$ is given to the particle, which represents positions of the minimum and maximum values of the particle i in a $d^{th}$ dimension. This position needs to be set according to the problem being researched, and there is no suggested value.

$$IF(x_{ij}(t+1) > x_{id}\_\text{max} \| x_{ij}(t+1) < x_{id}\_\text{min})$$

$$\text{THEN } x_{ij}(t+1) = \text{random}(x_{id}\_\text{min}, x_{id}\_\text{max})$$

In addition, the velocity of the particle in each dimension must be limited, and the velocity will not be negative. $v_{id}\_\text{max}$ represents the maximum velocity of the particle i in the $d^{th}$ dimension, which needs to be set according to the problem being researched, and there is no suggested value.

$$IF(v_{ij}(t+1) > v_{id}\_\text{max} \| v_{ij}(t+1) < -v_{id}\_\text{max})$$

$$\text{THEN } v_{ij}(t+1) = \text{random}(0, v_{id}\_\text{max})$$

Figure 3:
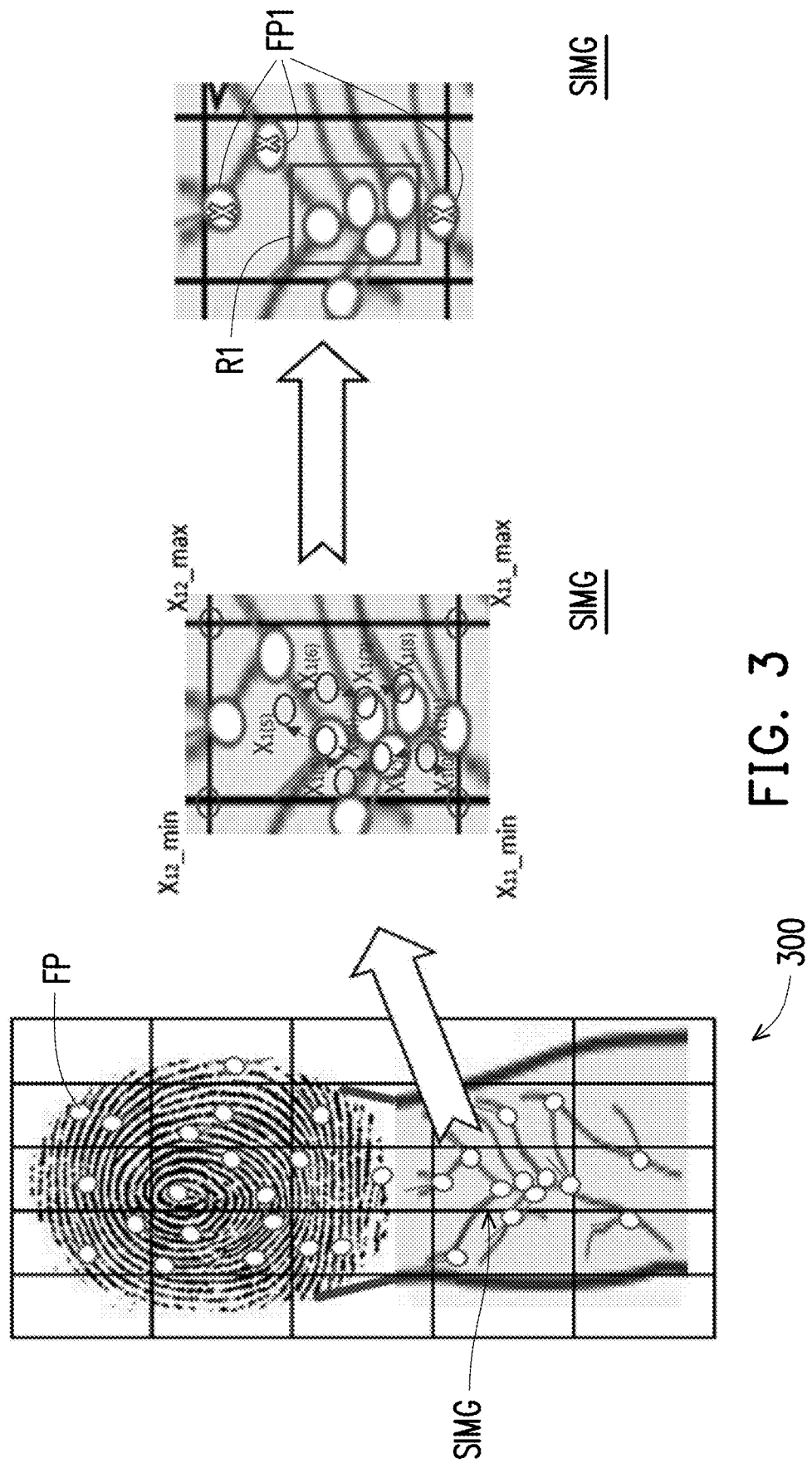
FIG. 3 is a schematic diagram of a method for obtaining features of biometrics according to an embodiment of the invention.

With mathematical morphology in combination with the PSO algorithm, the selection of fingerprint finger vein features becomes very similar to a method using humans' vision. FIG. 3 is a schematic diagram of a method for obtaining features of biometrics according to an embodiment of the invention. Referring to FIG. 3, FIG. 3 describes step ones to three. An image 300 includes a fingerprint and a finger vein. The processor 101 divides the image 300 into an M*N two-dimensional block matrix and obtains a plurality of sub-images (for example, squares), and the sub-images are on the binary image 300 obtained after performing a mathematical morphology algorithm. Each circle in each sub-image of the image 300 of FIG. 3 represents a feature point marked and extracted in step two. Taking a sub-image SIMG as an example, positions of four corners of the sub-image SIMG are respectively $X_{11}$_min, $X_{11}$_max, $X_{12}$_min, and $X_{12}$_max. It is assumed that during execution of PSO, the number in brackets of $X_1$ represents the number of cycles (for example, $X_1(0)$ to $X_1(8)$), and each cycle determines whether there is a feature point in a position, and if yes, the feature point is recorded. After the operation is iterated until convergence, a specific region R1 in the sub-image SIMG may be found, and the specific region R1 has the highest density of feature points in the sub-image SIMG. Feature points FP1 outside the specific region R1 in the sub-image SIMG are discarded. It should be noted that although the sub-image SIMG of FIG. 3 is taken as an example for description, the above process is also performed on other sub-images in the image 300 to find a specific region with the most feature points in each of the sub-images, and the feature points in that specific region may be regarded as an optimal set of finger features.

After step three, the processor 101 identifies from among the feature points image (i.e., second feature points in each sub-image) in the specific region of each sub-image a plurality of feature points (also referred to as third feature points) for performing a biometric operation. A method for finding the third feature points may be performed by steps four and five.

[Step Four: Sample Acquisition]

In step four, the processor 101 repeats the above steps 1 to 3 on other finger images (for example, other finger samples) and obtains a plurality of optimal sets, and the sets include feature points (also referred to as fourth feature points) in other finger images that are for performing a biometric operation. The processor 101 selects from the second feature points and the fourth feature points the feature points having a number of repeated occurrences greater than a threshold value (also referred to as a first threshold value) as the third feature points for performing the biometric operation. Namely, the processor 101 selects the feature points that appear more frequently from all the optimal sets of the image to form an optimal feature set of a model.

[Step Five: Feature Reselection]

In step five, the processor 101 determines whether the number of the third feature points in the optimal feature set found in step four is greater than a threshold value (also referred to as a second threshold value). When the number of the third feature points is greater than the second threshold value, the processor 101 selects a plurality of feature points (also referred to as fifth feature points) from the third feature points to perform the biometric operation according to the fifth feature points. Particularly, the number of the fifth feature points is smaller than that of the third feature points, and an identification rate that may be achieved by performing the biometric operation according to the fifth feature points is not less than an identification rate achieved by performing the biometric operation according to the third feature points. In the embodiment, a sequential forward selection (SFS) method may be used to find the feature points with the highest identification ability. However, it should be noted that if the number of the third feature points obtained after step four is not excessive, step five may be omitted.

The SFS method includes the following steps in sequence: (1) using the nearest neighbor rule and an identification rate estimation method of "pick one at a time"; (2) the first selected feature must be a feature with the highest identification rate; (3) the next selected feature must be one with the highest identification rate after being merged with the previously selected feature; (4) repeating step (3) until the selected feature point satisfies the aforementioned definition of fifth feature point.

An SFS algorithm is exemplified as follows. It is assumed that in the examples in of Tables 1 to 6, the fingerprint feature points are F1, F3, F5, F7, F9, and F11 and the finger vein feature points are F2, F4, F6, F8, F10, and F12. It is assumed that an identification rate of 97.8% may be achieved by using the fingerprint feature points F1, F3, F5, F7, F9, F11 and the finger vein feature points F2, F4, F6, F8, F10, F12 simultaneously to perform a biometric operation.

First, the processor 101 selects one feature point which has the highest identification rate in a biometric operation. In the example of Table 1, the processor 101 selects the feature point F7 as a fifth feature point.

TABLE 1

| Feature point | Identification rate | Feature point | Identification rate | Feature point | Identification rate |
|---|---|---|---|---|---|
| F1 | 57.9% | F5 | 50.0% | F9 | 48.9% |
| F2 | 56.2% | F6 | 60.1% | F10 | 64.0% |
| F3 | 37.6% | F7 | 69.7% | F11 | 56.2% |
| F4 | 39.3% | F8 | 35.4% | F12 | 58.4% |

Then, referring to Table 2, the processor 101 calculates an identification rate in the biometric operation performed according to two feature points including the feature point F7, and accordingly learns that the identification rate achieved according to the feature points F7 and F10 is the highest. Thus, the processor 101 selects the feature point F10 to join the fifth feature points.

TABLE 2

| Feature point | Identification rate | Feature point | Identification rate | Feature point | Identification rate |
|---|---|---|---|---|---|
| F7, F1 | 89.3% | F7, F5 | 87.6% | F7, F9 | 75.8% |
| F7, F2 | 74.2% | F7, F6 | 71.3% | F7, F10 | 92.7% |
| F7, F3 | 73.6% |  |  | F7, F11 | 86.5% |
| F7, F4 | 77.5% | F7, F8 | 73.0% | F7, F12 | 77.5% |

Then, referring to Table 3, the processor 101 calculates an identification rate in the biometric operation performed according to three feature points including the feature points F7 and F10, and accordingly learns that the identification rate achieved according to the feature points F7, F10 and F12 is the highest. Thus, the processor 101 selects the feature point F12 to join the fifth feature points.

TABLE 3

| Feature point | Identification rate | Feature point | Identification rate | Feature point | Identification rate |
|---|---|---|---|---|---|
| F7, F10, F1 | 94.4% | F7, F10, F5 | 93.3% | F7, F10, F9 | 91.6% |
| F7, F10, F2 | 93.3% | F7, F10, F6 | 92.7% |  |  |
| F7, F10, F3 | 93.8% |  |  | F7, F10, F11 | 92.7% |
| F7, F10, F4 | 89.3% | F7, F10, F8 | 92.7% | F7, F10, F12 | 96.6% |

Then, referring to Table 4, similarly to Tables 2 and 3, the processor 101 selects the feature point F11 to join the fifth feature points.

TABLE 4

| Feature point | Identification rate | Feature point | Identification rate | Feature point | Identification rate |
|---|---|---|---|---|---|
| F7, F10, F12, F1 | 94.9% | F7, F10, F12, F5 | 95.5% | F7, F10, F12, F9 | 93.8% |
| F7, F10, F12, F2 | 94.9% | F7, F10, F12, F6 | 94.9% | | |
| F7, F10, F12, F3 | 94.4% | | | F7, F10, F12, F11 | 96.6% |
| F7, F10, F12, F4 | 93.3% | F7, F10, F12, F8 | 94.9% | | |

Then, referring to Table 5, similarly to Tables 2 to 4, the processor 101 selects the feature point F1 to join the fifth feature points.

TABLE 5

| Feature point | Identification rate | Feature point | Identification rate | Feature point | Identification rate |
|---|---|---|---|---|---|
| F7, F10, F12, F11, F1 | 97.2% | F7, F10, F12, F11, F5 | 94.9% | F7, F10, F12, F11, F9 | 94.9% |
| F7, F10, F12, F11, F2 | 96.6% | F7, F10, F12, F11, F6 | 93.8% | | |
| F7, F10, F12, F11, F3 | 94.4% | | | | |
| F7, F10, F12, F11, F4 | 95.5% | F7, F10, F12, F11, F8 | 93.3% | | |

Then, referring to Table 6, similarly to Tables 2 to 5, the processor 101 selects the feature point F5 to join the fifth feature points.

TABLE 6

| Feature point | Identification rate | Feature point | Identification rate | Feature point | Identification rate |
|---|---|---|---|---|---|
| | | F7, F10, F12, F11, F1, F5 | 97.8% | F7, F10, F12, F11, F1, F9 | 96.6% |
| F7, F10, F12, F11, F1, F2 | 97.2% | F7, F10, F12, F11, F1, F6 | 96.6% | | |
| F7, F10, F12, F11, F1, F3 | 97.2% | | | | |
| F7, F10, F12, F11, F1, F4 | 96.6% | F7, F10, F12, F11, F1, F8 | 97.2% | | |

Particularly, since the current fifth feature points are the feature points F7, F10, F12, F11, F1, and F5, and the identification rate (i.e., 97.8%) that may be achieved by these feature points and the identification rate achieved by using of all the feature points (i.e., the feature points F1 to F12) are the same, the processor 101 only needs to use a feature set composed of the feature points F7, F10, F12, F11, F1 and F5 to perform a biometric operation.

Based on the above, the method for obtaining features of biometrics of the invention is capable of finding from an image with a plurality of biological features a small number of feature points for performing a biometric operation, and the identification rate that may be achieved by these feature points is not less than the identification rate achieved by using all the feature points in the image.

Moreover, the invention also provides two kinds of biometric identification processes using an encryption/decryption method. They are described in detail below as a "first encryption biometric method" and a "second encryption biometric method", respectively.

[First Encryption Biometric Method]

An embodiment of the first encryption biometric method is mainly based on an asymmetric encryption method. The asymmetric encryption method is, for example, a Rivest-Shamir-Adleman (RSA) algorithm. The RSA algorithm is based on a very simple number theory: to multiply two large factors is easy, but to factorize the product thereof is difficult; therefore the product can be used as a public key for encryption (commonly known as public key). A private key corresponding to the public key can be used to decrypt ciphertext encrypted by the public key. Details of the RSA algorithm may be learned from the related art and are omitted herein.

The first encryption biometric method of the invention mainly includes a registration phase and an identification phase, where the registration phase includes the following steps (a) to (b) and the identification phase includes the following steps (c) to (d).

Step (a): in the registration phase, in order to avoid a man-in-the-middle attack, two sets of public and private keys may be generated by a certifier (for example, an impartial third party). For example, a first public key, a first private key corresponding to the first public key, a second public key and a second private key corresponding to the second public key may be generated. The first private key is for decrypting ciphertext encrypted by the first public key, and the second private key is for decrypting ciphertext encrypted by the second public key. In the embodiment, the first public key and the first private key are used to encrypt and decrypt fingerprint data, and the second public key and the second private key are used to encrypt and decrypt finger vein data. The processor 101 obtains the aforementioned two sets of public and private keys (for example, through a communication circuit).

Step (b): following the aforementioned registration phase of step (a), every time a person's finger is sampled, the processor 101 stores numerical value data of the feature points of fingerprint and finger vein respectively in different secure isolated regions in the storage circuit 115 at the same time. In the embodiment, the processor 101 stores the feature points (also referred to as first type biological features) for fingerprint among the third feature points found according to the aforementioned method in a storage region (also referred to as a second storage region) corresponding to finger vein in the storage circuit 115. Moreover, the processor 101 stores the feature points (also referred to as second type biological features) for finger vein among the third feature points found according to the aforementioned method in a storage region (also referred to as a first storage region) corresponding to fingerprint in the storage circuit 115. Taking following Table 7 as an example, a fingerprint storage region R1 is for storing the finger vein data. Similarly, a finger vein storage region R2 is for storing the fingerprint data. By storing the finger vein data in the fingerprint storage region R1 and storing the fingerprint data in the finger vein storage region R2, it is possible to fool an attacker and improve data storage security.

TABLE 7

| Fingerprint storage region R1 | Finger vein storage region R2 |
|---|---|
| Second private key | First private key |
| Finger vein feature set of left thumb (T1_1) | Fingerprint feature set of left thumb (T2_1) |
| Finger vein feature set of left index finger (T1_2) | Fingerprint feature set of left index finger (T2_2) |
| ... | ... |
| Finger vein feature set of right index finger (T1_7) | Fingerprint feature set of right index finger (T2_7) |
| ... | ... |
| Finger vein feature set of right little finger (T1_10) | Fingerprint feature set of right little finger (T2_10) |

Step (c): When a user intends to perform identification, the user operates an electronic device (for example, an electronic device different from the electronic device 100) to obtain fingerprint feature points and finger vein feature points for identification by the method for obtaining features of biometrics of the invention. The user's electronic device encrypts the fingerprint feature points by the first public key and generates first encrypted data, encrypts the finger vein feature points by the second public key and generates second encrypted data, and then transmits the encrypted data (i.e., the first encrypted data and the second encrypted data) to the electronic device 100.

When the processor 101 obtains the encrypted data received through a communication circuit (not shown), the processor 101 decrypts the first encrypted data by the first private key to obtain to-be-verified fingerprint feature points (referred to as first to-be-verified feature points). Similarly, the processor 101 decrypts the second encrypted data by the second private key to obtain to-be-verified finger vein feature points (referred to as second to-be-verified feature points). The processor 101 uses the first to-be-verified feature points and the second to-be-verified feature points to perform the biometric operation.

Step (d): When the biometric operation is performed, according to the first to-be-verified feature points, the processor 101 obtains matching data (also referred to as first matching data) with the most similarity from the finger vein storage region R2. According to the second to-be-verified feature points, the processor 101 obtains matching data (also referred to as second matching data) from the fingerprint storage region R1. Then, the processor 101 determines whether the first matching data and the second matching data meet a preset normalization standard. In other words, the processor 101 determines whether the similarity between the first matching data and the first to-be-verified feature point is greater than a threshold value, and the processor 101 determines whether the similarity between the second matching data and the second to-be-verified feature point is greater than the threshold value.

In response to at least one of the first matching data and the second matching data not meeting the preset normalization standard, the processor 101 determines that the aforementioned plurality of encrypted data (i.e., the first encrypted data and second encrypted data) have not passed verification. In response to both of the first matching data and the second matching data meeting the preset normalization standard (i.e., greater than the aforementioned threshold value), the processor 101 determines whether an index of the first matching data is the same as an index of the second matching data. As shown in Table 7, since the fingerprint data and the finger vein data of the same finger are stored in the same row, and the same row is represented by an index (not shown), this step is used to determine whether the first matching data and the second matching data belong to the same finger.

In response to the index of the first matching data being the same as the index of the second matching data, the processor 101 determines that the plurality of encrypted data have passed the verification. In response to the index of the first matching data not being the same as the index of the second matching data, the processor 101 determines that the plurality of encrypted data have not passed the verification.

Figure 4:
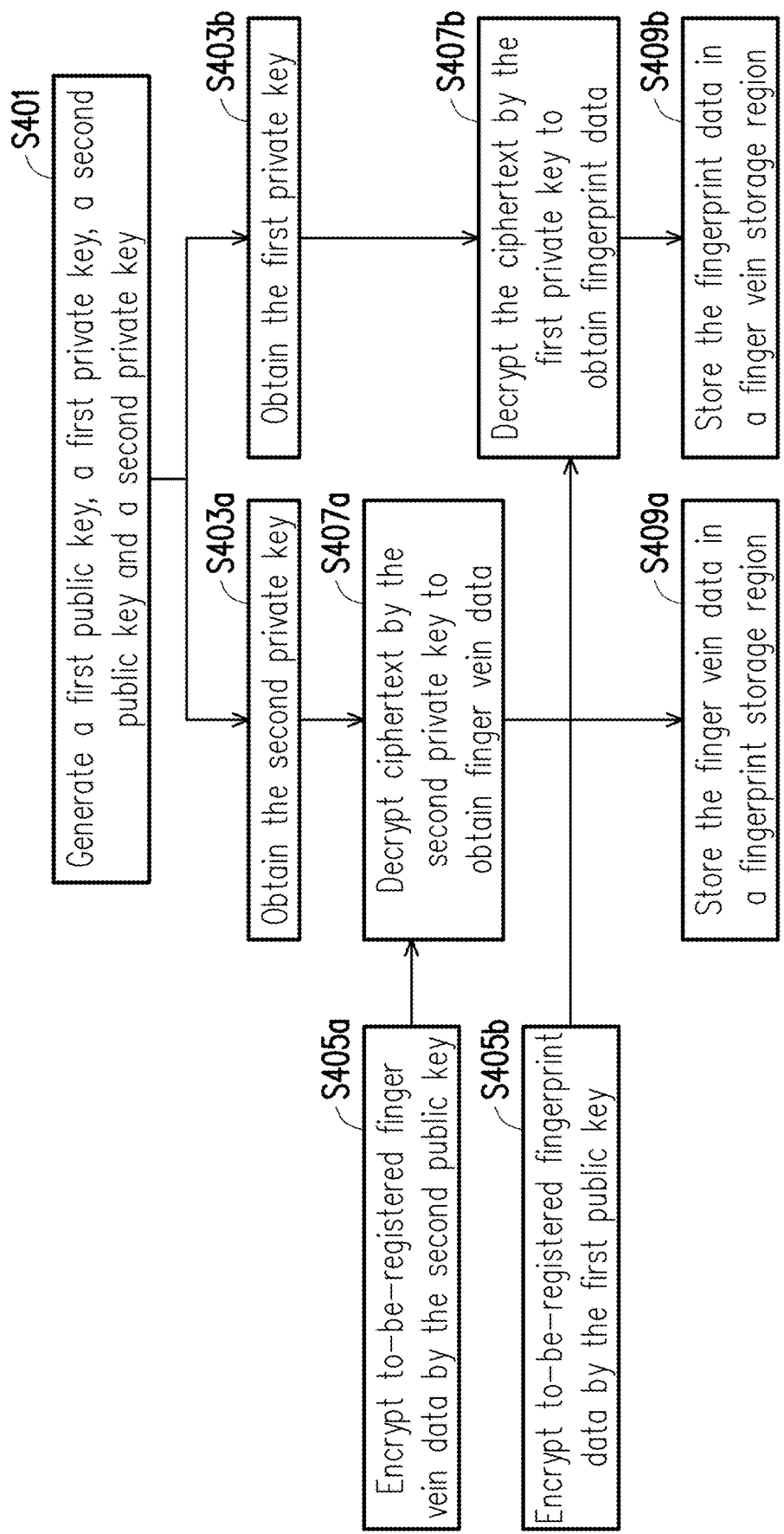
FIG. 4 is a schematic diagram of a registration phase of a first encryption biometric method according to an embodiment of the invention.

FIG. 4 is a schematic diagram of a registration phase of the first encryption biometric method according to an embodiment of the invention.

Referring to FIG. 4, in step S401, an intermediate certifier generates the first public key, the first private key, the second public key and the second private key. Thereafter, in steps S403a and S403b, the processor 101 obtains the second private key and the first private key through the communication circuit. If a user wishes to register remotely, in step S405a, the user's electronic device encrypts to-be-registered finger vein data by the second public key, and transmits it to the electronic device 100. Similarly, in step S405b, the user's electronic device encrypts the to-be-registered fingerprint data by the first public key, and transmits it to the electronic device 100. Thereafter, in step S407a, the processor 101 decrypts ciphertext of step S405a by the second private key to obtain finger vein data, and finally stores the finger vein data in the fingerprint storage region R1 in step S409a. Moreover, in step S407b, the processor 101 decrypts ciphertext of step S405b by the first private key to obtain fingerprint data, and finally stores the fingerprint data in the finger vein storage region R2 in step S409b.

Figure 5:
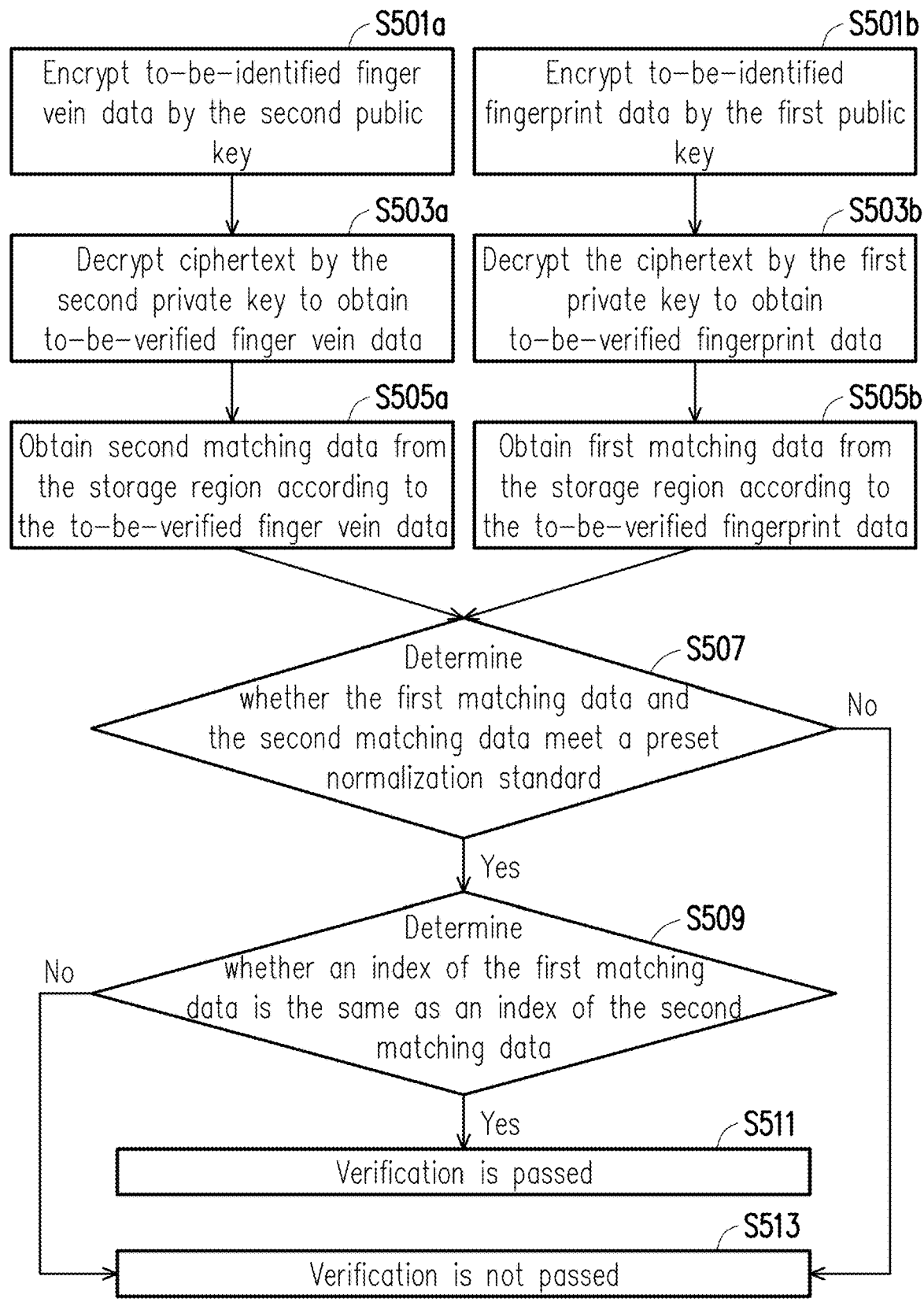
FIG. 5 is a schematic diagram of an identification phase of the first encryption biometric method according to an embodiment of the invention.

FIG. 5 is a schematic diagram of an identification phase of the first encryption biometric method according to an embodiment of the invention.

Referring to FIG. 5, if a user wishes to use biometrics remotely, in step S501a, the user's electronic device encrypts to-be-identified finger vein data by the second public key and transmits it to the electronic device 100. Similarly, in step S501b, the user's electronic device encrypts the to-be-identified fingerprint data by the first public key and transmits it to the electronic device 100.

Thereafter, in step S503a, the processor 101 decrypts ciphertext of step S501a by the second private key to obtain to-be-verified finger vein data. In step S505a, the processor 101 obtains the second matching data from the storage region R1 according to the to-be-verified finger vein data.

Similarly, in step S503b, the processor 101 decrypts ciphertext of step S501b by the first private key to obtain to-be-verified fingerprint data. In step S505b, the processor 101 obtains the first matching data from the storage region R2 according to the to-be-verified fingerprint data.

In step S507, the processor 101 determines whether the first matching data and the second matching data meet a preset normalization standard. In response to at least one of the first matching data and the second matching data not meeting the preset normalization standard, the processor 101 executes step S513 and determines that the verification is not passed. In response to both of the first matching data and the second matching data meeting the preset normalization standard, in step S509, the processor 101 determines whether the index of the first matching data is the same as the index of the second matching data.

In response to the index of the first matching data being the same as the index of the second matching data, in step S511, the processor 101 determines that the verification is passed. In response to the index of the first matching data not being the same as the index of the second matching data, the processor 101 determines that the verification is not passed.

Particularly, operation of the first encryption biometric method is explained using a practical scenario below.

In order to quickly find a specific user's public key and private key and to achieve remote backup and identification, the invention proposes to establish a hash table of "key value-data pairs". Key code values (for example, employee ID, bank account, etc.) are encoded and encrypted using appropriate hash functions, and content of the data is stored in a location (device ID) where the public key and private key are located. If rows selected by the hash functions collide (i.e., two pieces of data are stored in the same row), the collision may be resolved by methods such as a collision resolution algorithm (for example, chaining (i.e., using a link list method to connect data that hash to the same bucket), or open addressing (i.e., using a probing method to find an "empty bucket" in a table for storing the data)), etc.

Figure 6:
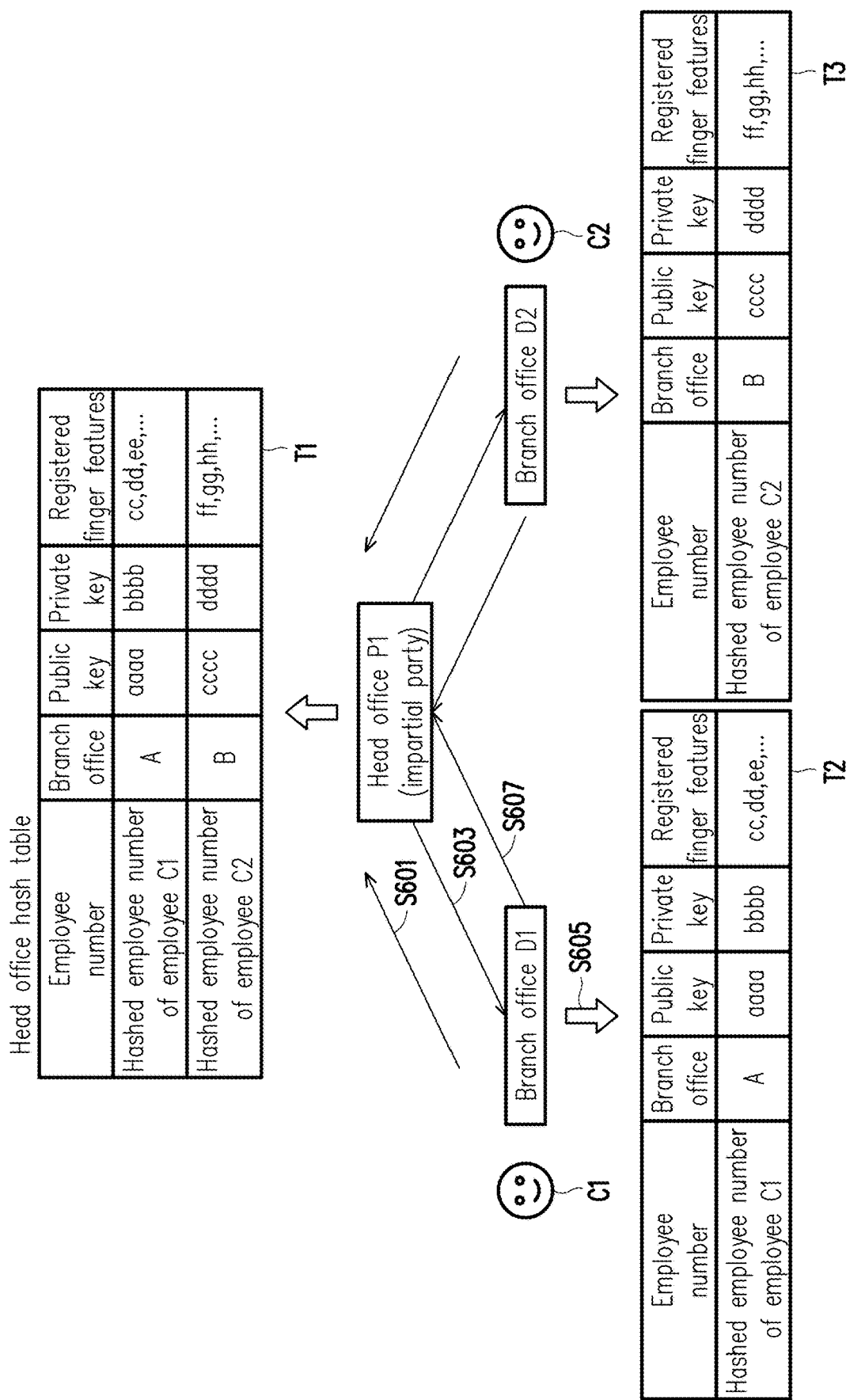
FIG. 6 is a schematic diagram of a registration phase of remote backup and identification according to an embodiment of the invention.

FIG. 6 is a schematic diagram of a registration phase of the remote backup and identification according to an embodiment of the invention.

Referring to FIG. 6, it is assumed that a new employee C1 reports for duty and is registered at a branch office D1 located at a place A. In step S601, a device at the place A first transmits the employee C1's employee number and location to a head office P1. After receiving the above message, the head office P1 (also an impartial party) hashes the employee C1's employee number and obtains a value (also referred to as a first hash value), then generates the employee C1's public key and private key, and finally generates a row in a hash table t1 for storing the above data.

In step S603, the head office P1 transmits the first hash value, and the employee C1's public key and private key back to a device used by the employee C1 at the branch office D1.

In step S605, the device at the branch office D1 first hashes employee C1's employee number for comparison. If a hashed employee number generated in step S605 is the same as the aforementioned first hash value, the aforementioned method for obtaining features of biometrics and the registration process of the first encryption biometric method are performed. Particularly, at this moment, public key encryption and private key decryption are not required for the registration process. The device at the branch office D1 generates data such as a row in the hash table T1, the hashed employee number of the employee C1, the public key of the employee C1, the private key of the employee C1, a finger feature of the employee C1, etc.

In step S607, the device at the branch office D1 transmits the hashed employee number of the employee C1 and the registered finger feature encrypted by the public key of the employee C1 back to the head office P1.

Thereafter, the head office P1 quickly finds a row in the hash table T1 corresponding to the hashed employee number of the employee C1, and then decrypts the finger feature by the private key of the employee C1, and finally stores it in the hash table T1 of the head office P1. It should be noted that at this moment, public key encryption and private key decryption are not required for the registration phase.

By the above method, finally, the device at the branch office D1 and the device at the head office P1 both have the data of the employee C1, thereby achieving a remote backup. Moreover, a registration method of an employee C2 in FIG. 6 is similar to the registration method of the employee C1 mentioned above and is omitted herein.

Figure 7:
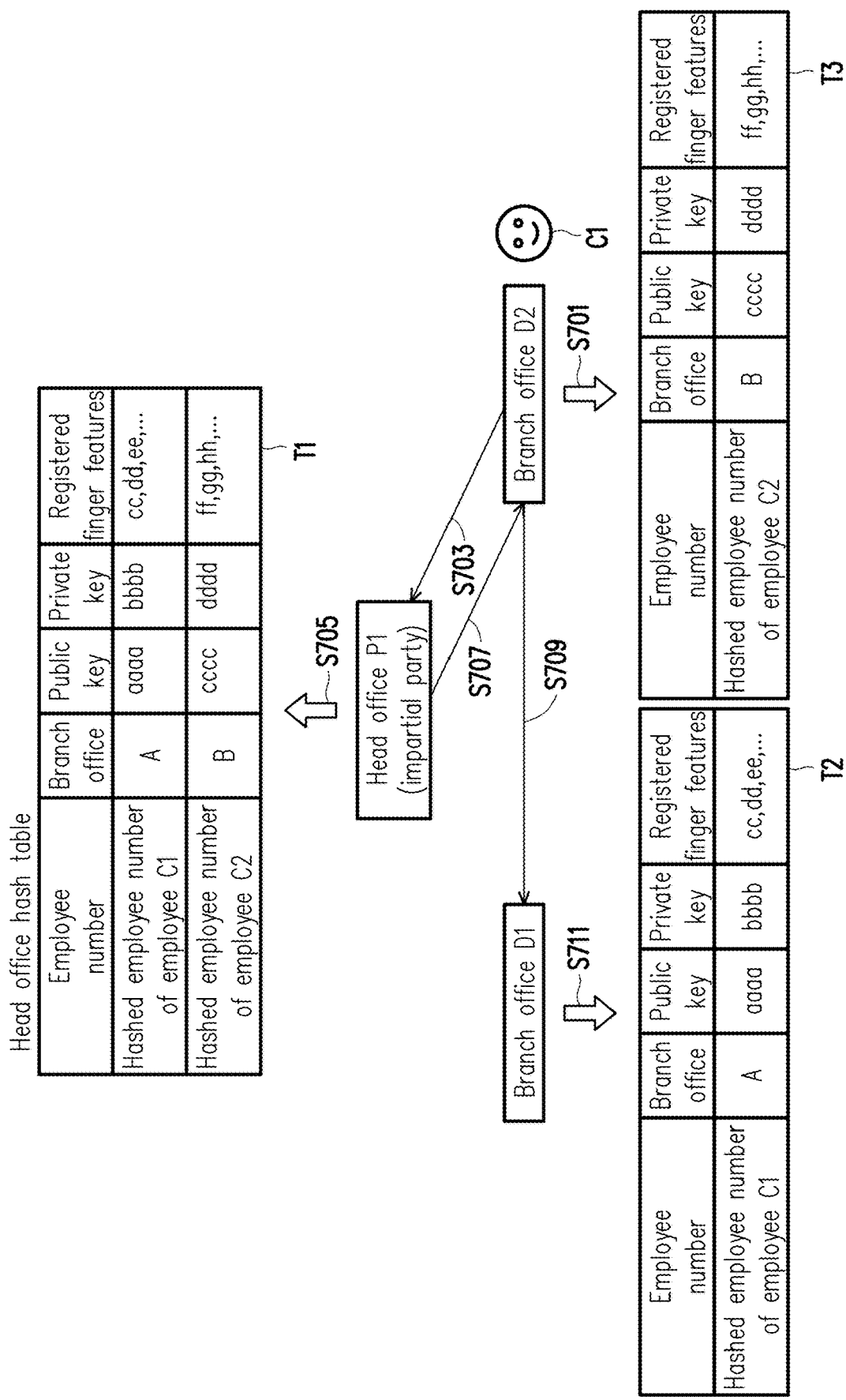
FIG. 7 is a schematic diagram of an identification phase of the remote backup and identification according to an embodiment of the invention.

FIG. 7 is a schematic diagram of an identification phase of the remote backup and identification according to an embodiment of the invention.

Referring to FIG. 7, it is assumed that the employee C1 usually works at the branch office D1 at the place A, and therefore uses the device at the branch office D1 at the place A to perform identification. In the identification process, the registered finger feature of the employee C1 can be quickly found simply by hashing the employee C1's employee number and searching it in a hash table T2. Particularly, public key encryption and private key decryption are not required for this identification phase.

If one day the employee C1 goes to a branch office D2 at a place B, since a hash table T3 of the branch office D2 does not have the data of the employee C1, following steps are executed:

In step S701, a device at the branch office D2 first hashes the employee C1's employee number and then searches it in the hash table T3. At this moment, it is discovered that the hash table T3 does not have the data of the employee C1.

In step S703, the device at the branch office D2 transmits the hashed employee number of the employee C1 to the head office P1.

In step S705, the device at the head office P1 finds the row storing the data of the employee C1 in the hash table T1 of the head office P1 according to the hashed employee number of the employee C1.

In step S707, the device at the head office P1 transmits the hashed employee number of the employee C1, the public key of the employee C1, and the branch office to which the employee C1 belongs back to the device at the branch office D2.

In step S709, the device at the branch office D2 encrypts the to-be-identified finger feature of the employee C1 by the obtained public key of the employee C1, and then transmits the to-be-identified finger feature together with the hashed employee number of the employee C1 to the device at branch office D1.

In step S711, after receiving the hashed employee number of the employee C1, the device at the branch office D1 searches the hash table T2 for the private key of the employee C1. Then, the device at the branch office D1 decrypts the received to-be-identified finger feature, which is encrypted by the public key of the employee C1, for identification. Particularly, public key encryption and private key decryption are required for the identification phase executed in the embodiment.

Based on the above method, although the data of the employee C1 is not stored in the device at the branch office D2, remote identification can be achieved by connecting to the device at the head office through the above process.

[Second Encryption Biometric Method]

Figure 8:
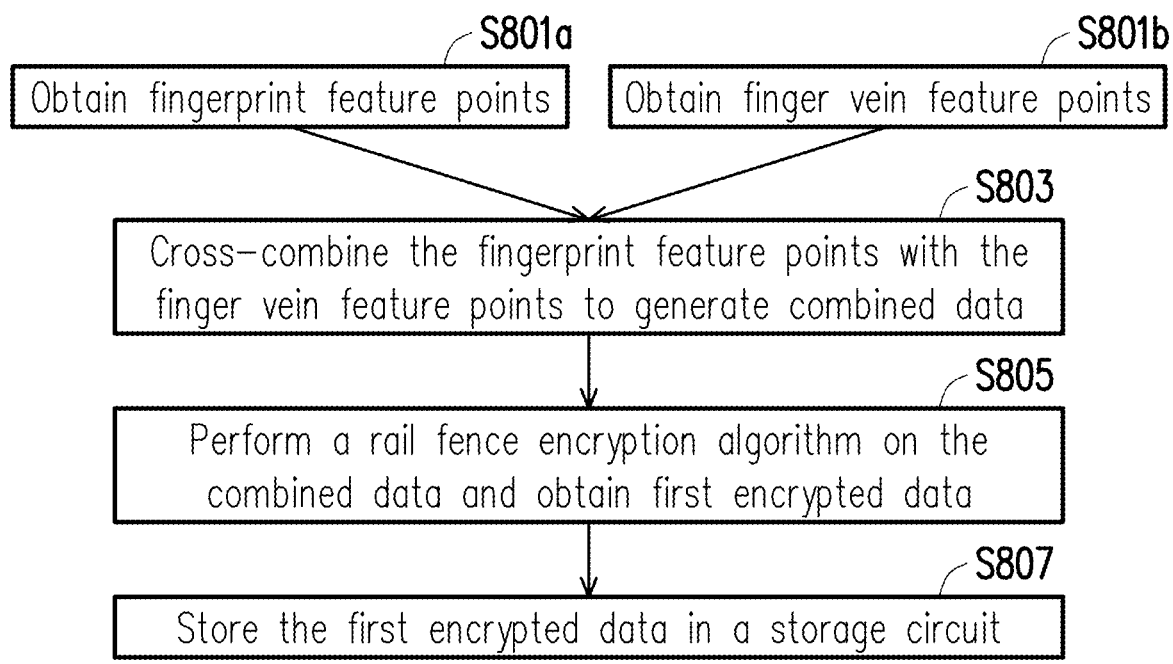
FIG. 8 is a schematic diagram of a registration phase of a second encryption biometric method according to an embodiment of the invention.

The second encryption biometric method of the invention is based on a rail fence encryption algorithm. FIG. 8 is a schematic diagram of a registration phase of the second encryption biometric method according to an embodiment of the invention. Referring to FIG. 8, it is assumed that fingerprint feature points among the third feature points are obtained in step S801*a* during sampling of a user, and finger vein feature points among the third feature points are obtained in step S801*b*. Then, in step S803, the processor 101 cross-combines the fingerprint feature points with the finger vein feature points to generate combined data. Then, in step S805, a rail fence encryption algorithm is performed on the combined data to obtain the first encrypted data, and the first encrypted data is stored in the storage circuit 115 in step S807.

An example is provided below to describe the above process. If the fingerprint feature points obtained in step S801a are (84, 101, 73), and the finger vein feature points obtained in step S801b are (104, 39, 501), the combined data is (84, 104, 101, 39, 73, 501). The combined data may be represented by a string of numbers such as "841041013973501", and this value is used to perform the rail fence encryption algorithm.

It should be noted that the rail fence encryption algorithm is to divide to-be-encrypted plaintext into groups of N, and then combine an $N^{th}$ character of each group with each other, and finally connect the combined characters. For example, if N=2, for the combined data "841041013973501", a first set of numerical values is generated by taking the numerical values at odd positions, and the first set of numerical values is "81403751". A second set of numerical values is generated by taking the values at even positions, and the second set of values is "4011930". After connecting the first set of numerical values with the second set of numerical values in series, encrypted data with a value of "814037514011930" is obtained, and the encrypted data is stored in the storage circuit 115.

Figure 9:
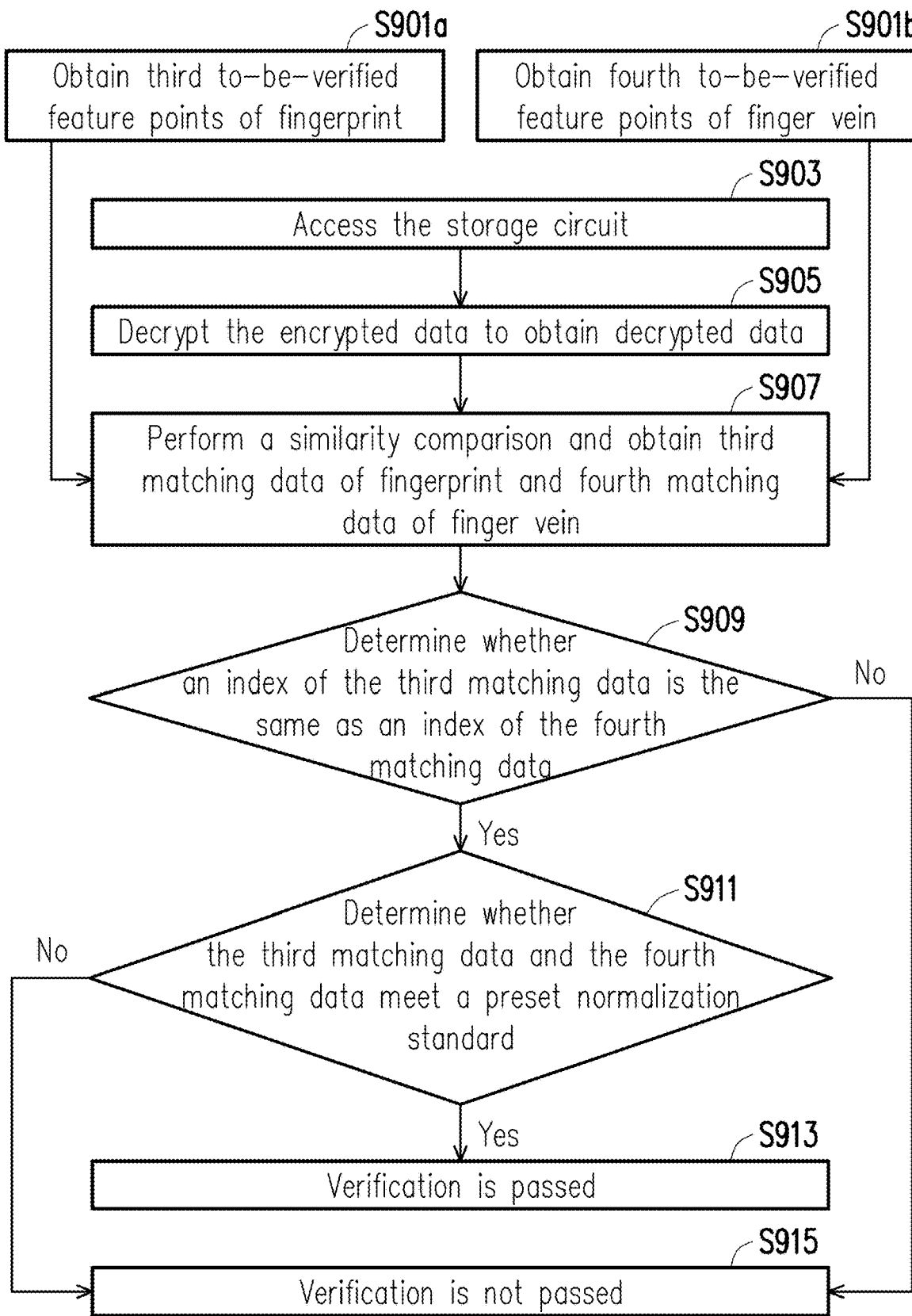
FIG. 9 is a schematic diagram of an identification phase of the second encryption biometric method according to an embodiment of the invention.

FIG. 9 is a schematic diagram of an identification phase of the second encryption biometric method according to an embodiment of the invention. Referring to FIG. 9, in steps S901a and S901b, the processor 101 obtains to-be-verified fingerprint feature points (also referred to as third to-be-verified feature points) and to-be-verified finger vein feature points (also referred to as fourth to-be-verified feature points), respectively. In step S903, the processor 101 accesses the storage circuit 115, and in step S905, the processor 101 decrypts the encrypted data to obtain decrypted data. In step S907, the processor 101 compares the decrypted data generated in step S905 with the third to-be-verified feature points and the fourth to-be-verified feature points and obtains fingerprint feature points (referred to as third matching data) with the highest similarity and finger vein feature points (referred to as fourth matching data) with the highest similarity. Then, in step S909, the processor 101 determines whether an index of the third matching data is the same as an index of the fourth matching data, and determines whether the third matching data and the fourth matching data belong to the same finger.

In response to the index of the third matching data not being the same as the index of the fourth matching data, the processor 101 executes step S915 and determines that the biometric operation is not passed.

In response to the index of the third matching data being the same as the index of the fourth matching data, the processor 101 executes step S911 and determines whether the third matching data and the fourth matching data meet a preset normalization standard. The meaning of the normalization standard is similar to that in the aforementioned embodiment and is omitted herein.

In response to at least one of the third matching data and the fourth matching data not meeting the preset normalization standard, the processor 101 executes step S915 and determines that the biometric operation is not passed. In response to both of the third matching data and the fourth matching data meeting the preset normalization standard, the processor 101 determines that the biometric operation is passed.

Figure 10:
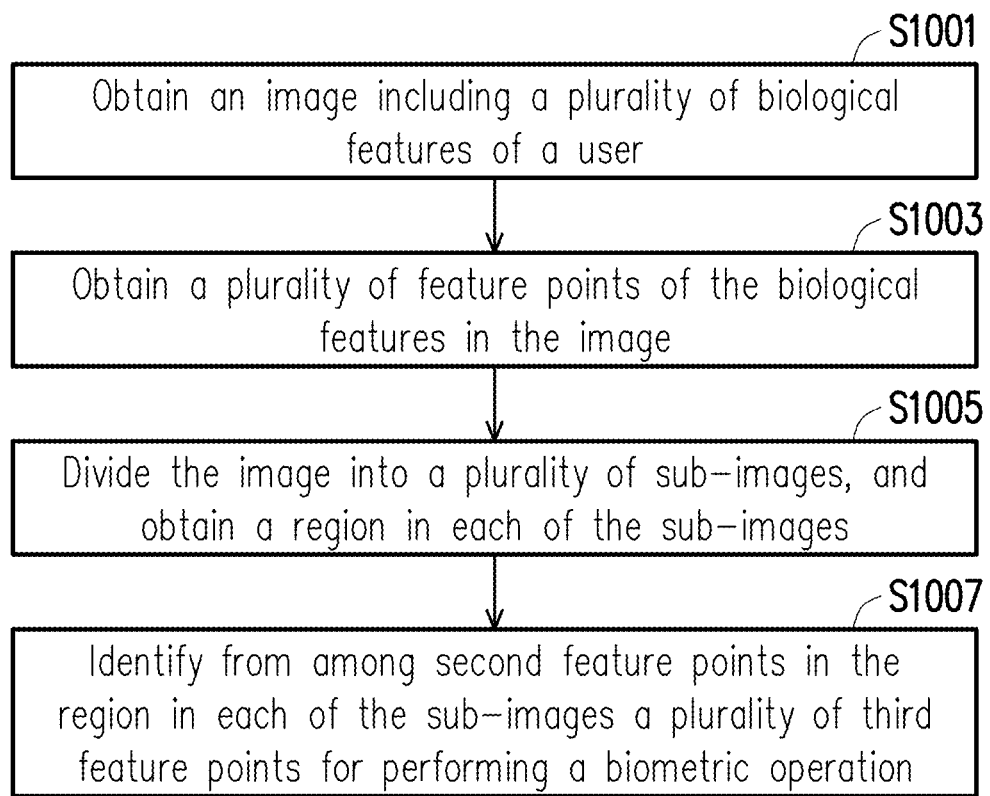
FIG. 10 is a flowchart illustrating a method for obtaining features of biometrics according to an embodiment of the invention.

FIG. 10 is a flowchart illustrating a method for obtaining features of biometrics according to an embodiment of the invention. Referring to FIG. 10, in step S1001, the input circuit 103 obtains an image including a plurality of biological features of a user. In step S1003, the processor 101 obtains a plurality of feature points of the biological features in the image. In step S1005, the processor 101 divides the image into a plurality of sub-images, and obtains a region in each of the sub-images, where each of the sub-images includes a plurality of first feature points among the feature points, and a plurality of second feature points among the first feature points have a higher distribution density in the region than in other regions in the sub-image where the region belongs to. In step S1007, the processor 101 identifies from among the second feature points in the obtained region in each of the sub-images a plurality of third feature points for performing a biometric operation.

In summary, the invention provides an electronic device and a method for obtaining features of biometrics, which integrate and simultaneously use multiple biological features (such as fingerprint and finger vein) for identification, thereby improving accuracy and convenience of biometrics. Particularly, the invention uses an NIR optical principle to obtain a finger image and uses an algorithm to obtain the optimal biological features for identification to perform multi-modal identification, thereby improving preservation, remote backup and identification of the biological features. In terms of applications, the invention may be used by companies and enterprises to strengthen access control and attendance management of employees. Or, an application programming interface (API) for development purposes may be provided and connected to other devices via a USB to form the Internet of things, which can be used to develop an application system in combination with biometrics, access management, information utilization, etc., thereby creating business opportunities in other fields such as finance industry and security industry and increasing profits.

What is claimed is:

1. An electronic device, comprising:
an input circuit; and
a processor, coupled to the input circuit, wherein
the input circuit obtains an image comprising a plurality of biological features of a user,
the processor obtains a plurality of feature points of the plurality of biological features in the image,
the processor divides the image into a plurality of sub-images, and obtains a region in each of the plurality of sub-images, wherein each of the plurality of sub-images comprises a plurality of first feature points among the plurality of feature points, and a plurality of second feature points among the plurality of first feature points have a higher distribution density in the region than in other regions in the sub-image where the region belongs to,
the processor identifies from among the plurality of second feature points in the region in each of the plurality of sub-images a plurality of third feature points for performing a biometric operation, wherein in identifying the plurality of third feature points for performing the biometric operation,
the processor obtains a plurality of fourth feature points for performing the biometric operation from other images,
the processor selects from among the plurality of second feature points and the plurality of fourth feature points feature points having a number of repeated occurrences greater than a first threshold value as the plurality of third feature points.

2. The electronic device as claimed in claim 1, wherein after identifying the plurality of third feature points for performing the biometric operation, the processor determines whether the number of the plurality of third feature points is greater than a second threshold value, when the number of the plurality of third feature points is greater than the second threshold value, the processor selects a plurality of fifth feature points from among the plurality of third feature points to perform the biometric operation according to the plurality of fifth feature points, wherein the number of the plurality of fifth feature points is smaller than the number of the plurality of third feature points, and an identification rate achieved by performing the biometric operation according to the plurality of fifth feature points is not less than an identification rate achieved by performing the biometric operation according to the plurality of third feature points.

3. The electronic device as claimed in claim 1, wherein in obtaining the plurality of feature points of the plurality of biological features in the image, the processor performs a pre-processing and a binarization processing on the image, the processor performs a morphology operation on the binarized image and obtains the plurality of feature points, the processor classifies the plurality of features points into types, and marks each of the plurality of feature points with its type in the binarized image.

4. The electronic device as claimed in claim 1, wherein the plurality of biological features comprise a first type biological feature and a second type biological feature, and the electronic device further comprises:

a storage circuit, coupled to the processor, wherein the processor stores among the plurality of third feature points the feature points belonging to the first type biological feature in a second storage region corresponding to the second type biological feature in the storage circuit, and stores among the plurality of third feature points the feature points belonging to the second type biological feature in a first storage region corresponding to the first type biological feature in the storage circuit.

5. The electronic device as claimed in claim 4, further comprising:

a communication circuit, coupled to the processor, wherein the processor obtains a first public key, a first private key corresponding to the first public key, a second public key and a second private key corresponding to the second public key, the processor obtains a plurality of encrypted data received by the communication circuit, wherein the plurality of encrypted data comprise first encrypted data encrypted by the first public key and second encrypted data encrypted by the second public key, the processor decrypts the first encrypted data, by the first private key, to obtain a first to-be-verified feature point of the first type biological feature, the processor decrypts the second encrypted data, by the second private key, to obtain a second to-be-verified feature point of the second type biological feature, the processor performs the biometric operation using the first to-be-verified feature point and the second to-be-verified feature point, wherein in performing the biometric operation using the first to-be-verified feature point and the second to-be-verified feature point, the processor obtains first matching data with the highest similarity from the second storage region according to the first to-be-verified feature point, the processor obtains second matching data with the highest similarity from the first storage region according to the second to-be-verified feature point, the processor determines whether an index of the first matching data is the same as an index of the second matching data, in response to the index of the first matching data being the same as the index of the second matching data, the processor determines that the plurality of encrypted data have passed verification, in response to the index of the first matching data not being the same as the index of the second matching data, the processor determines that the plurality of encrypted data have not passed the verification.

6. The electronic device as claimed in claim 5, wherein before determining whether the index of the first matching data is the same as the index of the second matching data, the processor determines whether the first matching data and the second matching data meet a preset normalization standard, in response to at least one of the first matching data and the second matching data not meeting the preset normalization standard, the processor determines that the plurality of encrypted data have not passed the verification, in response to both of the first matching data and the second matching data meeting the preset normalization standard, the processor determines whether the index of the first matching data is the same as the index of the second matching data.

7. The electronic device as claimed in claim 1, wherein the plurality of biological features comprise a first type biological feature and a second type biological feature, and the electronic device further comprises:

a storage circuit, coupled to the processor, wherein the processor cross-combines the feature points among the plurality of third feature points that belong to the first type biological feature with the feature points among the plurality of third feature points that belong to the second type biological feature to generate combined data, performs a rail fence encryption algorithm on the combined data and obtains first encrypted data, and stores the first encrypted data in the storage circuit.

8. The electronic device as claimed in claim 7, wherein the processor obtains a third to-be-verified feature point of the first type biological feature and a fourth to-be-verified feature point of the second type biological feature, the processor decrypts at least one encrypted data stored in the storage circuit and obtains at least one decrypted data, the processor compares the decrypted data with the third to-be-verified feature point and the fourth to-be-verified feature point and obtains third matching data with the highest similarity in the first type biological feature and fourth matching data with the highest similarity in the second type biological feature, the processor determines whether the third matching data and the fourth matching data meet a preset normalization standard, in response to at least one of the third matching data and the fourth matching data not meeting the preset normalization standard, the processor determines that the biometric operation is not passed, in response to both of the first matching data and the second matching data meeting the preset normalization standard, the processor determines that the biometric operation is passed.

9. The electronic device as claimed in claim 8, wherein before determining whether the third matching data and the fourth matching data meet the preset normalization standard,
the processor determines whether an index of the third matching data is the same as an index of the fourth matching data,
in response to the index of the third matching data being the same as the index of the fourth matching data, the processor determines whether the third matching data and the fourth matching data meet the preset normalization standard,
in response to the index of the third matching data not being the same as the index of the fourth matching data, the processor determines that the biometric operation is not passed.

10. A method for obtaining features of biometrics, adapted to an electronic device, wherein the electronic device comprises an input circuit and a processor, the method comprising:
obtaining, by the input circuit, an image comprising a plurality of biological features of a user;
obtaining, by the processor, a plurality of feature points of the plurality of biological features in the image;
dividing, by the processor, the image into a plurality of sub-images and obtaining a region in each of the plurality of sub-images, wherein each of the plurality of sub-images comprises a plurality of first feature points among the plurality of feature points, and a plurality of second feature points among the plurality of first feature points have a higher distribution density in the region than in other regions in the sub-image where the region belongs to; and
identifying, by the processor, from among the plurality of second feature points in the region in each of the plurality of sub-images a plurality of third feature points for performing a biometric operation, comprising:
obtaining, by the processor, a plurality of fourth feature points for performing the biometric operation from other images; and
selecting, by the processor, from among the plurality of second feature points and the plurality of fourth feature points feature points having a number of repeated occurrences greater than a first threshold value as the plurality of third feature points.

11. The method for obtaining features of biometrics as claimed in claim 10, further comprising, after identifying the third feature points for performing the biometric operation:
determining, by the processor, whether the number of the plurality of third feature points is greater than a second threshold value; and
when the number of the plurality of third feature points is greater than the second threshold value, selecting a plurality of fifth feature points from among the third plurality of feature points to perform the biometric operation according to the plurality of fifth feature points,
wherein the number of the plurality of fifth feature points is smaller than the number of the plurality of third feature points, and an identification rate achieved by performing the biometric operation according to the plurality of fifth feature points is not less than an identification rate achieved by performing the plurality of biometric operation according to the third feature points.

12. The method for obtaining features of biometrics as claimed in claim 10, wherein obtaining the plurality of feature points of the plurality of biological features in the image comprises:
performing, by the processor, a pre-processing and a binarization processing on the image;
performing, by the processor, a morphology operation on the binarized image and obtaining the plurality of feature points; and
classifying, by the processor, the plurality of features points into types, and marking each of the plurality of feature points with its type in the binarized image.

13. The method for obtaining features of biometrics as claimed in claim 10, wherein the plurality of biological features comprise a first type biological feature and a second type biological feature, the electronic device further comprises a storage circuit, and the method further comprises:
storing, by the processor, among the plurality of third feature points the feature points belonging to the first type biological feature in a second storage region corresponding to the second type biological feature in the storage circuit, and storing among the plurality of third feature points the feature points belonging to the second type biological feature in a first storage region corresponding to the first type biological feature in the storage circuit.

14. The method for obtaining features of biometrics as claimed in claim 13, wherein the electronic device further comprises a communication circuit, and the method performed by the processor further comprises:
obtaining a first public key, a first private key corresponding to the first public key, a second public key and a second private key corresponding to the second public key;
obtaining a plurality of encrypted data received by the communication circuit, wherein the plurality of encrypted data comprise first encrypted data encrypted by the first public key and second encrypted data encrypted by the second public key;
decrypting the first encrypted data by the first private key and obtaining a first to-be-verified feature point of the first type biological feature;
decrypting the second encrypted data by the second private key and obtaining a second to-be-verified feature point of the second type biological feature; and
performing the biometric operation using the first to-be-verified feature point and the second to-be-verified feature point,
wherein performing the biometric operation using the first to-be-verified feature point and the second to-be-verified feature point comprises:
obtaining first matching data with the highest similarity from the second storage region according to the first to-be-verified feature point;
obtaining second matching data with the highest similarity from the first storage region according to the second to-be-verified feature point;
determining whether an index of the first matching data is the same as an index of the second matching data;
in response to the index of the first matching data being the same as the index of the second matching data, determining that the plurality of encrypted data have passed verification; and in response to the index of the first matching data not being the same as the index of the second matching data, determining that the plurality of encrypted data have not passed the verification.

15. The method for obtaining features of biometrics as claimed in claim 14, further comprising, before determining whether the index of the first matching data is the same as the index of the second matching data:
   determining, by the processor, whether the first matching data and the second matching data meet a preset normalization standard;
   in response to at least one of the first matching data and the second matching data not meeting the preset normalization standard, determining that the plurality of encrypted data have not passed the verification; and
   in response to both of the first matching data and the second matching data meeting the preset normalization standard, determining whether the index of the first matching data is the same as the index of the second matching data.

16. The method for obtaining features of biometrics as claimed in claim 10, wherein the plurality of biological features comprise a first type biological feature and a second type biological feature, the electronic device further comprises a storage circuit, and the method further comprises:
   cross-combining the feature points among the plurality of third feature points that belong to the first type biological feature with the feature points among the plurality of third feature points that belong to the second type biological feature to generate combined data by the processor, performing a rail fence encryption algorithm on the combined data and obtaining first encrypted data, and storing the first encrypted data in the storage circuit.

17. The method for obtaining features of biometrics as claimed in claim 10, further comprising:
   obtaining, by the processor, a third to-be-verified feature point of the first type biological feature and a fourth to-be-verified feature point of the second type biological feature;
   decrypting, by the processor, at least one encrypted data stored in the storage circuit and obtaining at least one decrypted data;
   comparing, by the processor, the decrypted data with the third to-be-verified feature point and the fourth to-be-verified feature point and obtaining third matching data with the highest similarity in the first type biological feature and fourth matching data with the highest similarity in the second type biological feature;
   determining, by the processor, whether the third matching data and the fourth matching data meet a preset normalization standard;
   in response to at least one of the third matching data and the fourth matching data not meeting the preset normalization standard, determining that the biometric operation is not passed; and
   in response to both of the first matching data and the second matching data meeting the preset normalization standard, determining that the biometric operation is passed.

18. The method for obtaining features of biometrics as claimed in claim 17, further comprising, before determining whether the third matching data and the fourth matching data meet the preset normalization standard:
   determining, by the processor, whether an index of the third matching data is the same as an index of the fourth matching data;
   in response to the index of the third matching data being the same as the index of the fourth matching data, determining whether the third matching data and the fourth matching data meet the preset normalization standard; and
   in response to the index of the third matching data not being the same as the index of the fourth matching data, determining that the biometric operation is not passed.

19. A method for obtaining features of biometrics, adapted to an electronic device, wherein the electronic device comprises an input circuit and a processor, the method comprising:
   obtaining, by the input circuit, an image comprising a plurality of biological features of a user;
   obtaining, by the processor, a plurality of feature points of the plurality of biological features in the image;
   dividing, by the processor, the image into a plurality of sub-images and obtaining a region in each of the plurality of sub-images, wherein each of the plurality of sub-images comprises a plurality of first feature points among the plurality of feature points, and a plurality of second feature points among the plurality of first feature points have a higher distribution density in the region than in other regions in the sub-image where the region belongs to;
   identifying, by the processor, from among the plurality of second feature points in the region in each of the plurality of sub-images a plurality of third feature points for performing a biometric operation; and
   determining, by the processor, whether the number of the plurality of third feature points is greater than a second threshold value after identifying the third feature points for performing the biometric operation; and
   when the number of the plurality of third feature points is greater than the second threshold value, selecting a plurality of fifth feature points from among the third plurality of feature points to perform the biometric operation according to the plurality of fifth feature points,
   wherein the number of the plurality of fifth feature points is smaller than the number of the plurality of third feature points, and an identification rate achieved by performing the biometric operation according to the plurality of fifth feature points is not less than an identification rate achieved by performing the plurality of biometric operation according to the third feature points.

20. A method for obtaining features of biometrics, adapted to an electronic device, wherein the electronic device comprises an input circuit, a processor, and a storage circuit, the method comprising:
   obtaining, by the input circuit, an image comprising a plurality of biological features of a user, wherein the plurality of biological features comprise a first type biological feature and a second type biological feature;
   obtaining, by the processor, a plurality of feature points of the plurality of biological features in the image;
   dividing, by the processor, the image into a plurality of sub-images and obtaining a region in each of the plurality of sub-images, wherein each of the plurality of sub-images comprises a plurality of first feature points among the plurality of feature points, and a plurality of second feature points among the plurality of first feature points have a higher distribution density in the region than in other regions in the sub-image where the region belongs to;

identifying, by the processor, from among the plurality of second feature points in the region in each of the plurality of sub-images a plurality of third feature points for performing a biometric operation; and storing, by the processor, among the plurality of third feature points the feature points belonging to the first type biological feature in a second storage region corresponding to the second type biological feature in the storage circuit, and storing among the plurality of third feature points the feature points belonging to the second type biological feature in a first storage region corresponding to the first type biological feature in the storage circuit.

21. The method for obtaining features of biometrics as claimed in claim 20, wherein the electronic device further comprises a communication circuit, and the method performed by the processor further comprises:

obtaining a first public key, a first private key corresponding to the first public key, a second public key and a second private key corresponding to the second public key;

obtaining a plurality of encrypted data received by the communication circuit, wherein the plurality of encrypted data comprise first encrypted data encrypted by the first public key and second encrypted data encrypted by the second public key;

decrypting the first encrypted data by the first private key and obtaining a first to-be-verified feature point of the first type biological feature;

decrypting the second encrypted data by the second private key and obtaining a second to-be-verified feature point of the second type biological feature; and performing the biometric operation using the first to-be-verified feature point and the second to-be-verified feature point, wherein performing the biometric operation using the first to-be-verified feature point and the second to-be-verified feature point comprises:

obtaining first matching data with the highest similarity from the second storage region according to the first to-be-verified feature point;

obtaining second matching data with the highest similarity from the first storage region according to the second to-be-verified feature point;

determining whether an index of the first matching data is the same as an index of the second matching data;

in response to the index of the first matching data being the same as the index of the second matching data, determining that the plurality of encrypted data have passed verification; and in response to the index of the first matching data not being the same as the index of the second matching data, determining that the plurality of encrypted data have not passed the verification.

22. The method for obtaining features of biometrics as claimed in claim 21, further comprising, before determining whether the index of the first matching data is the same as the index of the second matching data:

determining, by the processor, whether the first matching data and the second matching data meet a preset normalization standard;

in response to at least one of the first matching data and the second matching data not meeting the preset normalization standard, determining that the plurality of encrypted data have not passed the verification; and in response to both of the first matching data and the second matching data meeting the preset normalization standard, determining whether the index of the first matching data is the same as the index of the second matching data.

23. A method for obtaining features of biometrics, adapted to an electronic device, wherein the electronic device comprises an input circuit, a processor, and a storage circuit, the method comprising:

obtaining, by the input circuit, an image comprising a plurality of biological features of a user, wherein the plurality of biological features comprise a first type biological feature and a second type biological feature;

obtaining, by the processor, a plurality of feature points of the plurality of biological features in the image;

dividing, by the processor, the image into a plurality of sub-images and obtaining a region in each of the plurality of sub-images, wherein each of the plurality of sub-images comprises a plurality of first feature points among the plurality of feature points, and a plurality of second feature points among the plurality of first feature points have a higher distribution density in the region than in other regions in the sub-image where the region belongs to;

identifying, by the processor, from among the plurality of second feature points in the region in each of the plurality of sub-images a plurality of third feature points for performing a biometric operation; and cross-combining the feature points among the plurality of third feature points that belong to the first type biological feature with the feature points among the plurality of third feature points that belong to the second type biological feature to generate combined data by the processor, performing a rail fence encryption algorithm on the combined data and obtaining first encrypted data, and storing the first encrypted data in the storage circuit.

24. A method for obtaining features of biometrics, adapted to an electronic device, wherein the electronic device comprises an input circuit and a processor, the method comprising:

obtaining, by the input circuit, an image comprising a plurality of biological features of a user;

obtaining, by the processor, a plurality of feature points of the plurality of biological features in the image;

dividing, by the processor, the image into a plurality of sub-images and obtaining a region in each of the plurality of sub-images, wherein each of the plurality of sub-images comprises a plurality of first feature points among the plurality of feature points, and a plurality of second feature points among the plurality of first feature points have a higher distribution density in the region than in other regions in the sub-image where the region belongs to;

identifying, by the processor, from among the plurality of second feature points in the region in each of the plurality of sub-images a plurality of third feature points for performing a biometric operation;

obtaining, by the processor, a third to-be-verified feature point of the first type biological feature and a fourth to-be-verified feature point of the second type biological feature;

decrypting, by the processor, at least one encrypted data stored in the storage circuit and obtaining at least one decrypted data;

comparing, by the processor, the decrypted data with the third to-be-verified feature point and the fourth to-be-verified feature point and obtaining third matching data with the highest similarity in the first type biological feature and fourth matching data with the highest similarity in the second type biological feature;

determining, by the processor, whether the third matching data and the fourth matching data meet a preset normalization standard;

in response to at least one of the third matching data and the fourth matching data not meeting the preset normalization standard, determining that the biometric operation is not passed; and in response to both of the first matching data and the second matching data meeting the preset normalization standard, determining that the biometric operation is passed.

25. The method for obtaining features of biometrics as claimed in claim 24, further comprising, before determining whether the third matching data and the fourth matching data meet the preset normalization standard:

determining, by the processor, whether an index of the third matching data is the same as an index of the fourth matching data;

in response to the index of the third matching data being the same as the index of the fourth matching data, determining whether the third matching data and the fourth matching data meet the preset normalization standard; and in response to the index of the third matching data not being the same as the index of the fourth matching data, determining that the biometric operation is not passed.

* * * * *